(12) United States Patent
Mazzella et al.

(10) Patent No.: US 12,078,082 B2
(45) Date of Patent: Sep. 3, 2024

(54) NON-AXISYMMETRIC SECONDARY DUCT PORTION

(71) Applicant: SAFRAN AIRCRAFT ENGINES, Paris (FR)

(72) Inventors: Aurélien Mazzella, Moissy-Cramayel (FR); Laurent Soulat, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/438,058

(22) PCT Filed: Mar. 11, 2020

(86) PCT No.: PCT/FR2020/050505
§ 371 (c)(1),
(2) Date: Sep. 10, 2021

(87) PCT Pub. No.: WO2020/183109
PCT Pub. Date: Sep. 17, 2020

(65) Prior Publication Data
US 2022/0251961 A1 Aug. 11, 2022

(30) Foreign Application Priority Data
Mar. 12, 2019 (FR) ...................................... 1902476

(51) Int. Cl.
*F01D 9/04* (2006.01)
*F02K 3/02* (2006.01)
(52) U.S. Cl.
CPC ................ *F01D 9/041* (2013.01); *F02K 3/02* (2013.01); *F05D 2260/606* (2013.01)
(58) Field of Classification Search
CPC ..... F01D 9/00; F01D 9/02; F01D 9/04; F01D 9/041; F01D 9/042; F01D 25/24;
(Continued)

(56) References Cited

U.S. PATENT DOCUMENTS

| | | | | |
|---|---|---|---|---|
| 5,369,954 A | * | 12/1994 | Stuart | ........................ F02K 1/52 |
| | | | | 239/265.17 |
| 2010/0232954 A1 | * | 9/2010 | Clemen | ................. F04D 29/541 |
| | | | | 415/199.4 |

(Continued)

FOREIGN PATENT DOCUMENTS

| EP | 2371714 A2 | 10/2011 |
|---|---|---|
| EP | 3020952 A1 | 5/2016 |
| FR | 3012417 A1 | 5/2015 |

OTHER PUBLICATIONS

French Search Report and Written Opinion for French Application No. 1902476, dated Nov. 15, 2019.

(Continued)

*Primary Examiner* — Elton K Wong
(74) *Attorney, Agent, or Firm* — BIRCH, STEWART, KOLASCH & BIRCH, LLP

(57) ABSTRACT

The invention relates to a portion of a turbofan (1) extending about a longitudinal axis (A), comprising: —an outer wall (Pe) and an inner wall (Pi), defining a secondary duct portion (Vs), —a cascade of guide vanes (OGV), each guide vane extending within the secondary duct portion (Vs) between the outer wall (Pe) and the inner wall (Pi), wherein, in the region of the cascade of guide vanes (OGV), and in a plane orthogonal to the longitudinal axis (A), the distance from the outer wall (Pe) to the longitudinal axis (A) along a first axis (Xi) orthogonal to the longitudinal axis (A) is greater than the distance from the outer wall (Pi) to the longitudinal axis (A) along a second axis (X2) orthogonal to the longitudinal axis (A) and to the first axis (X1).

10 Claims, 3 Drawing Sheets

(58) Field of Classification Search
CPC . F01D 5/143; F02K 3/02; F02K 3/025; F02K 3/04; F02K 3/06; F05D 2260/606; F05D 2250/14; F02C 7/04; F02C 7/20
See application file for complete search history.

(56) References Cited

U.S. PATENT DOCUMENTS

| | | | |
|---|---|---|---|
| 2014/0064956 A1* | 3/2014 | Drane | F01D 5/282 415/209.3 |
| 2016/0130961 A1* | 5/2016 | Baralon | F01D 25/06 415/211.2 |
| 2017/0037813 A1 | 2/2017 | Dindar et al. | |

OTHER PUBLICATIONS

International Search Report for International Application No. PCT/FR2020/050505, dated Aug. 21, 2020.
Chinese Office Action and Search Report for Chinese Application No. 202080020811.1, dated May 14, 2024, with partial English translation.

* cited by examiner

NON-AXISYMMETRIC SECONDARY DUCT PORTION

GENERAL TECHNICAL FIELD

The invention relates to the secondary flowpaths of a bypass turbomachine with a high dilution ratio (or bypass ratio, BPR), particularly the secondary flowpath portion where stream straighteners from a fan, called OGV (outlet guide vane), are located.

STATE OF THE ART

As illustrated in FIG. 1a, a turbomachine 1 comprises a fan 2 downstream of which a primary flowpath Vp and a secondary flowpath Vs radially external to the primary flowpath are located.

The turbomachine 1 conventionally comprises a low-pressure body (in particular with a low-pressure compressor 3, a low-pressure turbine and a low-pressure shaft 4 which connects the two), a high-pressure body (in particular with a high-pressure compressor, a high-pressure turbine and a high-pressure shaft which connects the two) and a combustion chamber. Architectures with three bodies are possible. Finally, the low-pressure body drives in rotation the fan 2, either directly (direct drive) or via a reduction gear (not illustrated).

The primary flowpath Vp successively comprises the low-pressure compressor 3, the high-pressure compressor, the combustion chamber, the high-pressure turbine, the low-pressure turbine. The primary stream, which passes through the primary flowpath Vp, provides a small part of the total thrust. Indeed, it is the secondary stream through the secondary flowpath Vs, that provides most of the thrust (BPR typically greater than 7:1).

Straighteners, called OGVs, arranged in a grid (for example between 20 and 50 straightener vanes are disposed circumferentially around a fixed hub 6—see FIG. 1b) are at the outlet of the fan in the secondary flowpath. The function of these straighteners is to straighten the stream before its ejection by a nozzle (not illustrated). The secondary flowpath Vs has, in a sectional view, a regular ring shape, with a uniform distribution of the OGVs, so that the secondary flowpath surface S between each OGV vane is constant. The word "surface" is used here for a surface area or an air passage section.

The external radius of the secondary flowpath at the OGVs results from a compromise between:
- the aerodynamic performances of the OGV grid, which deteriorate when the Mach level increases and therefore when the surface of the flowpath decreases (because at constant flow rate, this means that the flow velocity increases),
- the mass of the engine, which increases when the diameter of the flowpath increases,
- the engine integration constraints, which impose the minimum internal radius of the secondary flowpath and limit the maximum external radius thereof (integration under the aircraft wing, ground clearance).

With the increase of the desired BPR levels, the vertical size of the engine becomes critical for in-under-wing integration.

One solution is to restrict the radius and therefore the section at the OGVs, but this leads to increasing the Mach number at this location and therefore increasing the losses of the OGVs.

The compromise then results in a situation where the performances of the OGV grid are limited by the external radius of the flowpath.

Documents EP 3 020 952 A1 and EP 2 371 714 A2 describe a turbomachine comprising a secondary flowpath outer wall, whose distance from the longitudinal axis of the turbomachine along a first axis is greater than the distance from the longitudinal axis of the turbomachine along a second axis.

PRESENTATION OF THE INVENTION

In order to solve some of the problems mentioned above, the invention proposes a portion of a bypass turbomachine extending about a longitudinal axis, comprising:
- an outer wall and an inner wall, defining a secondary flowpath portion,
- a grid of straightener vanes, each straightener extending within the secondary flowpath portion between the outer wall and the inner wall,
- wherein, at the grid of straightener vanes and in a plane orthogonal to the longitudinal axis, the distance from the outer wall to the longitudinal axis along a first axis orthogonal to the longitudinal axis is greater than the distance from the outer wall to the longitudinal axis along a second axis orthogonal to the longitudinal axis and to the first axis, and
- wherein the outer wall defines in the plane orthogonal to the longitudinal axis a concave-like shape when viewed from the interior of the flowpath (or convex from the exterior of the flowpath).

In this way, the section of the secondary flowpath is increased at the straightener vanes OGV, which allows lowering the flow velocity to the leading edge of the OGVs without modifying the vertical overall dimension of the engine. The negative effects mentioned in the introduction are reduced.

In one embodiment, the distance from the inner wall to the longitudinal axis along the first axis (at a 3 o'clock and/or 9 o'clock azimuth) is greater than the distance from the inner wall to the longitudinal axis along the second axis (at a 12 o'clock and/or 6 o'clock azimuth).

Preferably the ratio between the orthogonal distances from the outer wall to the longitudinal axis along the first axis on the one hand and along the second axis on the other hand is comprised between 1.05 and 1.5, taking into account the maximum distances (which can be elsewhere than on the first and the second axis, this ratio is comprised between 1.05 and 1.75).

Advantageously, the surface comprised between two adjacent straightener vanes, the inner wall and the outer wall, in a plane orthogonal to the longitudinal axis, is constant over the entire grid of straightener vanes, to within 10%.

In one embodiment, the distance from the outer wall to the longitudinal axis is minimum along the second axis (i.e. at a 12 o'clock or 6 o'clock azimuth) and/or maximum along the first axis (i.e. at a 3 o'clock or 9 o'clock azimuth).

In one embodiment, the distance from the outer wall to the longitudinal axis gradually increases when the azimuth moves from the second axis to the first axis, i.e. from the 12 o'clock or 6 o'clock azimuths to the 3 o'clock or 9 o'clock azimuths.

In one embodiment, the outer wall defines in the plane orthogonal to the longitudinal axis:
- an oval shape, i.e. a closed planar concave curve, having two orthogonal axes of symmetry, for example an ellipse or an oblong shape, an ovoid shape, i.e. a closed planar concave curve, having a single axis of symmetry.

In one embodiment, the outer wall defines in the plane orthogonal to the longitudinal axis an oblong shape constructed using two centers from which portions of circles, connected together by straight lines, are drawn.

The portions of circles can be semicircles or portions of a circle strictly smaller than a semicircle.

In one embodiment, the inner wall defines in the plane orthogonal to the longitudinal axis a shape identical to that of the outer wall, so that the height of the flowpath is generally constant.

In one embodiment, the distance between the two centers is comprised between strictly 0 and the radius of the portion of a circle of the inner wall.

The turbomachine portion may comprise a separation spout, upstream of the inner wall, the separation spout defining the separation of the stream between the secondary flowpath and a primary flowpath, in which the separation spout has an axisymmetric shape about the longitudinal axis.

The turbomachine portion may comprise an ejection nozzle, downstream of the outer wall, in which the nozzle has an axisymmetric shape about the longitudinal axis.

PRESENTATION OF THE FIGURES

Other characteristics, aims and advantages of the invention will emerge from the following description, which is purely illustrative and not limiting, and which should be read in relation to the appended drawings, in which.

DETAILED DESCRIPTION

Figure 2:
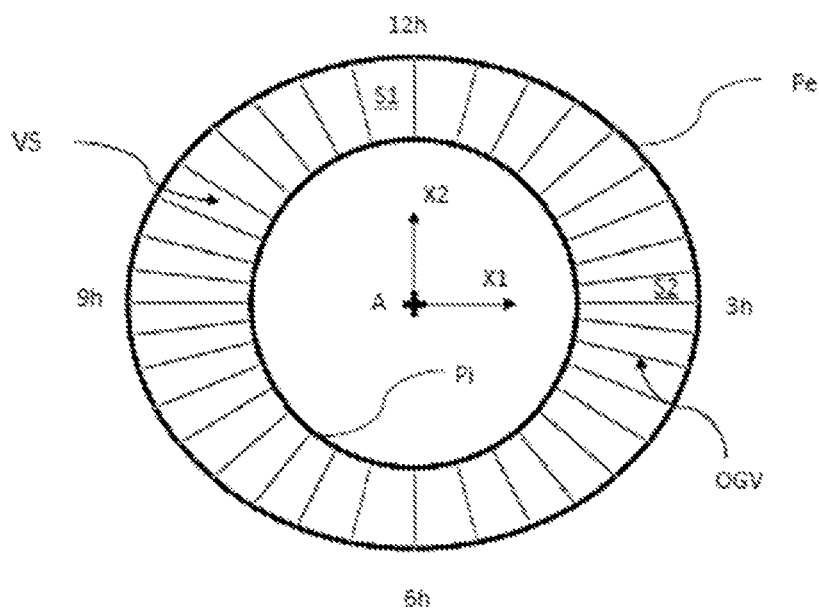
FIG. 2 illustrates a section of a non-axisymmetric secondary flowpath at the straighteners in a turbomachine according to one embodiment of the invention.

A portion of a bypass turbomachine 1 in accordance with one embodiment of the invention is illustrated in FIG. 2. The turbomachine extends about a longitudinal axis A; this axis corresponds in particular to an axis of rotation of a fan, of compressors and of turbines.

In a plane orthogonal to the longitudinal axis A, a first axis X1 is defined, corresponding in practice to a horizontal direction (when the turbomachine is mounted on a test bench or on a pylon typically under a wing), and a second axis X2, orthogonal to the first axis X1, corresponding in practice to a vertical direction. The two axes X1 and X2 intersect the longitudinal axis A.

In terms of azimuth, the first axis X1 corresponds to a 3 o'clock-9 o'clock azimuth and the first axis X2 corresponds to a 12 o'clock-6 o'clock azimuth.

The turbomachine portion 1 comprises an outer wall Pe and an inner wall Pi, which together define a secondary flowpath Vs portion inside which an air stream, called secondary stream, flows. The turbomachine portion 1 is downstream of the fan and upstream of an exhaust nozzle. The outer wall Pe is mounted on a casing (not illustrated) and the inner wall Pi is mounted on a hub (not illustrated).

A grid of straightener vanes OGV is within the secondary flowpath Vs portion. These straightener vanes extend along a substantially radial direction between the inner wall Pi and the outer wall Pe. Their role is to straighten the stream at the fan outlet.

The number of straightener vanes OGV can be comprised between 35 and 60, or between 30 and 40, or between 15 and 30.

According to a sectional view, illustrated in FIG. 2, the secondary flowpath Vs portion at the OGV grid is not axisymmetric: it is wider than it is high, which means that the orthogonal distance (also called radius) from the longitudinal axis A to the external wall Pe is greater along the first axis X1 (therefore at the 3 o'clock and 9 o'clock azimuths) than along the second axis (X2) (therefore at the 12 o'clock and 6 o'clock azimuths).

Thanks to this design, which widens the secondary flowpath at the OGVs, the flow velocity (at constant flow rate) and therefore the noise pollution, can be reduced. The enlargement takes advantage of the fact that there is room available to the right and to the left of a turbomachine when it is mounted under the wing, while there is no room below.

The ratio of the radius along the first axis X1 to the radius along the second axis X2 is typically comprised between 1.05 and 1.5.

The dimensional characterization given above does not mean that the orthogonal distance from the longitudinal axis A to the outer wall Pe is maximum on the first axis X1. This characterization aims to reflect the absence of axisymmetry.

The maximum radius to minimum radius ratio (from the longitudinal axis A) is typically comprised between 1.05 and 1.75.

Preferably, however, said distance is maximum along the first axis X1, either at the 3 o'clock azimuth, or at the 9 o'clock azimuth, or both.

Conversely, to optimize the vertical overall dimension, said distance is minimum along the second axis X2, either at the 12 o'clock azimuth, or at the 6 o'clock azimuth, or both.

A double symmetry along the two axes X1 and X2 is favored.

In addition, to have a uniform external wall Pe, said distance preferably increases continuously when the azimuth moves from the second axis X2 towards the first axis X1, (i.e. from the 12 o'clock azimuth to the 3 o'clock or 9 o'clock azimuth, and from the 6 o'clock azimuth to the 3 o'clock or 9 o'clock azimuth).

The external wall Pe defines a generally concave surface seen from the interior of the flowpath (seen from the longitudinal axis A, the external wall Pe is bulged radially outward), except that locally, deformations of the external wall Pe are planned (ancillary passage, etc.).

Several shapes of external wall Pe can be developed. The external wall Pe may have an oval shape (i.e., a closed planar concave curve viewed from the interior of the flowpath, having two orthogonal axes of symmetry, which are preferably the axes X1 and X2). The ellipses, the oblong shapes (two arcs of a circle connected together by straight lines or similar shapes) can be among the ovals.

The external wall Pe may have an ovoid shape (i.e., a closed planar concave curve viewed from the interior of the flowpath, having a single axis of symmetry, which is preferably the axis X1).

The internal wall Pi may not be axisymmetric and the same considerations as for the external wall Pe then apply. It is further possible that the shape of the non-axisymmetric internal wall Pi is different from the shape of the non-axisymmetric external wall Pe.

Thus, in one variant, the internal wall Pi has a circular sectional shape (FIG. 2). In another variant, this internal wall Pi is not axisymmetric (FIGS. 3a and 3b) and has a shape similar to that of the external wall Pe. In one variant, not illustrated, the internal wall Pi is not axisymmetric but not similar in shape to the external wall Pe.

FIG. 2 also illustrates the grid of straighteners OGV. In order to avoid the aerodynamic disturbances, the different OGV vanes are positioned so that the surfaces S1, S2 of the secondary flowpath Vs between two adjacent straightener vanes OGV are identical. Due to the absence of axisymmetry, a 10% tolerance between the maximum surface and the minimum surface can be accepted. As the flow rate is a function of the section and of the velocity, a constant section ensures a constant flow rate (at constant velocity).

Figure 1A:
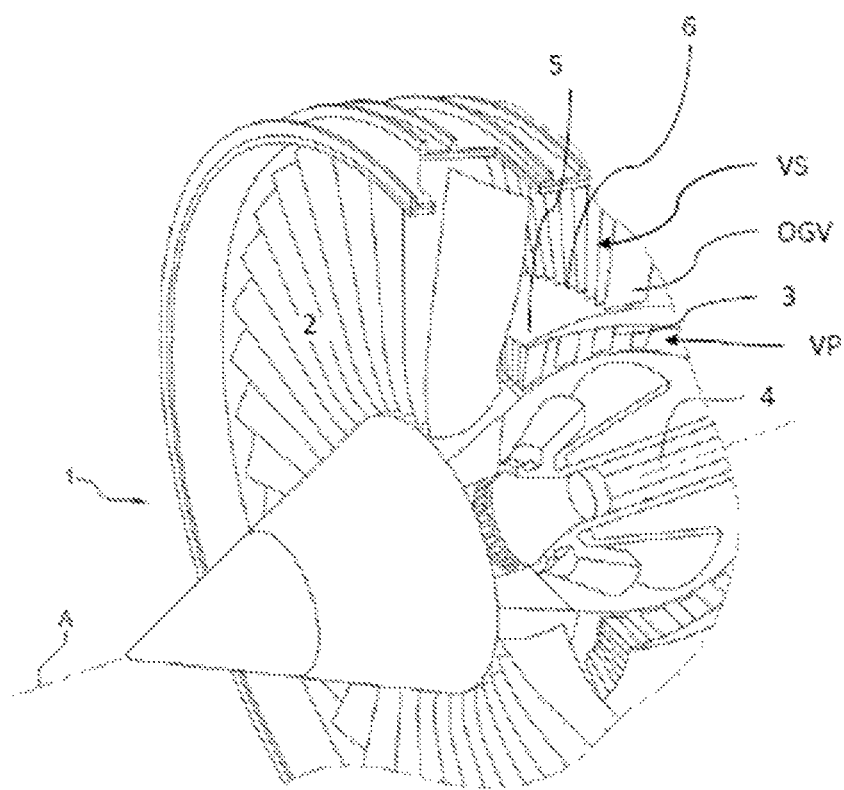
FIG. 1a illustrates a partial three-dimensional view of a conventional turbomachine.
Figure 1B:
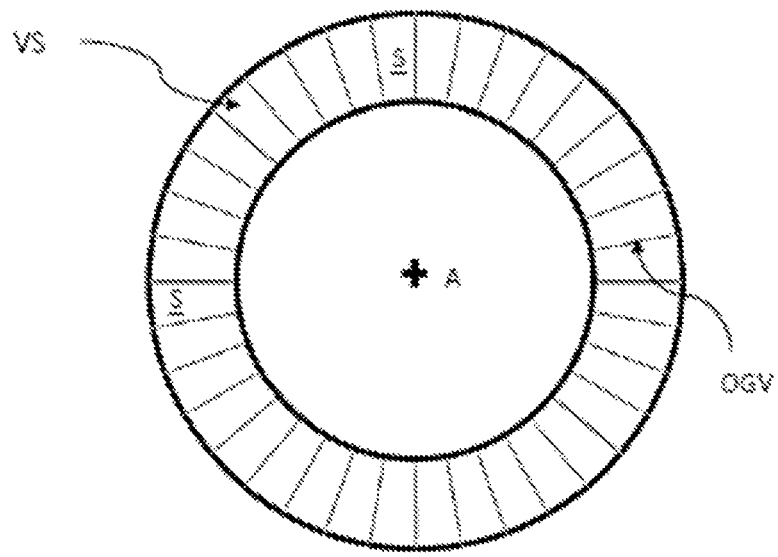
FIG. 1b illustrates a section of a secondary flowpath at the straighteners in a conventional turbomachine.

The OGV grid is located downstream of a separation spout 5 (see FIG. 1), at the junction between the primary VP and secondary Vs flowpaths, which separates the air stream derived from the fan into a primary stream and a secondary stream. The separation edge 5 (as illustrated in FIG. 1) has preferably an axisymmetric shape about the longitudinal axis A when the grid of straighteners OGV is sufficiently far from the separation spout 5 (for example more than 20 cm and particularly more than 50 cm). Alternatively, the latter can also not have an axisymmetric shape, but that requires revising the design of this part.

Now, one embodiment for designing an external wall Pe and an oblong internal wall Pi will be described, with reference to FIGS. 3a and 3b. The description is made in a plane orthogonal to the longitudinal axis A.

In this embodiment, the secondary flowpath Vs portion comprises two additional longitudinal axes A1 and A2, parallel to the longitudinal axis A, each positioned symmetrically (axial symmetry) to the other about the axis A, along the first axis X1. L is called the distance between the two axes A1 and A2 (in the plane orthogonal to these axes).

From A1 are drawn an arc of a circle which forms a side Pe1 of the outer wall Ve and another arc of a circle, of lower radius Ri, which forms a side of the inner wall Pi1.

From A2 are drawn an arc of a circle which forms a side Pe2 of the outer wall Ve and another arc of a circle, of radius Ri, which forms a side of the inner wall Pi2.

The sides Pe1 and Pe2, Pi1 and Pi2 have the same respective radii.

Figure 3A:
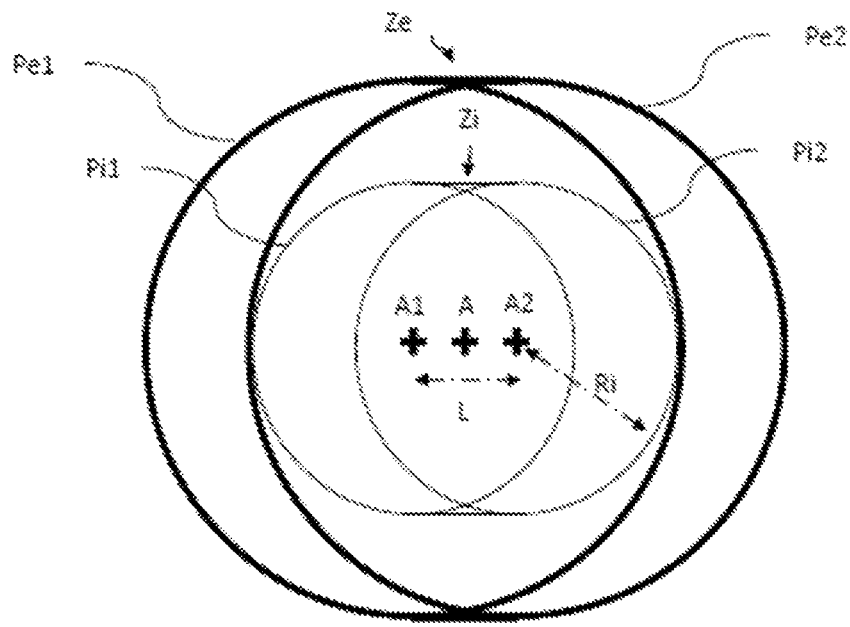
FIG. 3a illustrates one embodiment of a non-axisymmetric flowpath.
Figure 3B:
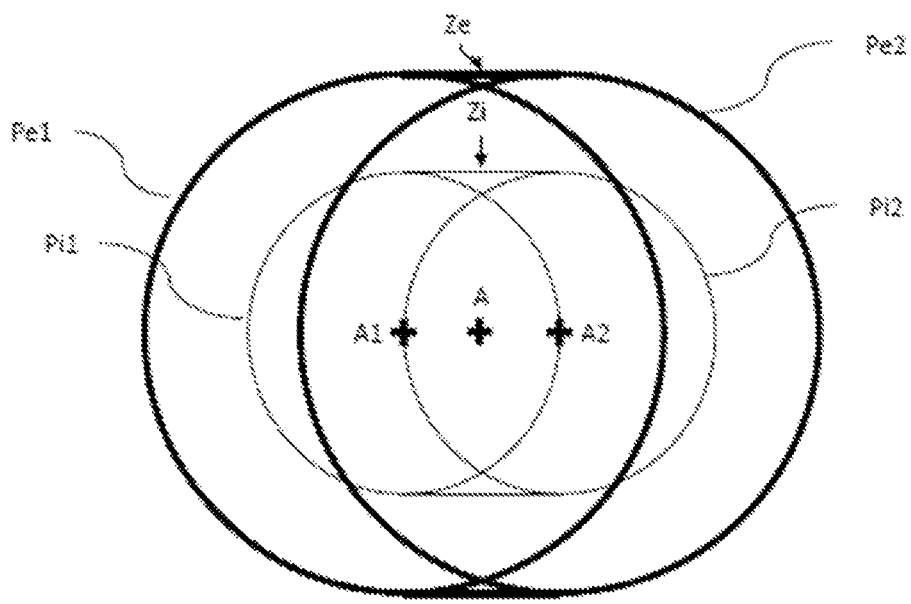
FIG. 3b illustrates one embodiment of a non-axisymmetric flowpath.

In FIGS. 3a and 3b, the arcs of a circle are semicircles.

Then, in order to finalize the flowpath, the sides Pe1 and Pe2 are connected by two rectilinear fittings Ze, and the sides Pi1 and Pi2 are connected by two rectilinear fittings Zi.

Alternatively, the arcs of a circle Pe1, Pe2, Pi1, Pi2 can be arcs of a circle strictly smaller than a semicircle. This allows increasing the radius of the outer wall Pe while limiting the vertical overall dimension. In order to have a surface that does not have a sudden interruption, a smooth connection is made, for example by a tangent between the arcs of a circle Pe1, Pe2 and the fittings Ze, respectively Pi1, Pi2 and Zi (not illustrated). Polynomial curves of degree 2 for example can be used.

The distance L between the two axes A1 and A2 is strictly greater than 0 (otherwise the flowpath portion is axisymmetric) and less than or equal to Ri (in FIG. 3b, L=Ri).

The major advantage of this embodiment is that it allows having areas of constant curvature on the walls Pe1, Pe2 and Pi1, Pi2, which simplifies the design and assembly of the grid of straighteners OGV: indeed, conversely, as in the embodiment of FIG. 2, it is necessary to provide a curvature adapted to the azimuth for each root and head of the straightener vane OGV.

In addition, this embodiment ensures a constant flowpath height: the straightener vanes OGV therefore have all the same length.

It is therefore possible to group together the straightener vanes OGV per family.

The invention claimed is:

1. A portion of a bypass of a turbomachine extending about a longitudinal axis, comprising:
    an outer wall and an inner wall, defining a secondary flowpath portion,
    a grid of outlet guide vanes, each outlet guide vane extending within the secondary flowpath portion between the outer wall and the inner wall,
    wherein, at the grid of outlet guide vanes and in a plane orthogonal to the longitudinal axis, a distance from the outer wall to the longitudinal axis along a first axis orthogonal to the longitudinal axis is greater than a distance from the outer wall to the longitudinal axis along a second axis orthogonal to the longitudinal axis and to the first axis,
    wherein the outer wall defines in the plane orthogonal to the longitudinal axis a concave-like shape when viewed from an interior of the secondary flowpath, and
    wherein the inner wall defines in said plane orthogonal to the longitudinal axis a shape identical to that of the outer wall, so that a height of the flowpath is generally constant.

2. The turbomachine portion according to claim 1, wherein the grid of outlet guide vanes comprises a plurality of surfaces, each surface being comprised between two adjacent outlet guide vanes, the inner wall and the outer wall, in a plane orthogonal to the longitudinal axis, wherein each surface has a surface area that varies from 0% to 10% compared to the other surfaces over the entire grid of outlet guide vanes.

3. The turbomachine portion according to claim 1, wherein the distance from the outer wall to the longitudinal axis is minimum along the second axis and/or maximum along the first axis.

4. The turbomachine portion according to claim 1, wherein the distance from the outer wall to the longitudinal axis gradually increases when an azimuth moves from the second axis to the first axis.

5. The turbomachine portion according to claim 1, wherein the outer wall defines in the plane orthogonal to the longitudinal axis:
    an oval shape, i.e. a closed planar concave curve when viewed from an interior of the secondary flowpath, having two orthogonal axes of symmetry,
    an ovoid shape, i.e. a closed planar concave curve when viewed from an interior of the secondary flowpath, having a single axis of symmetry.

6. The turbomachine portion according to claim 1, wherein the outer wall defines in said plane orthogonal to the longitudinal axis an oblong shape constructed using two centers from which portions of circles, connected together by straight lines, are drawn.

7. The turbomachine portion according to claim 1, comprising a separation spout, upstream of the inner wall, the separation spout defining the separation of the stream between the secondary flowpath and a primary flowpath, wherein the separation spout has an axisymmetric shape about the longitudinal axis.

8. The turbomachine portion according to claim 1, comprising an ejection nozzle, downstream of the outer wall, wherein the nozzle has an axisymmetric shape about the longitudinal axis.

9. A portion of a bypass of a turbomachine extending about a longitudinal axis, comprising:
- an outer wall and an inner wall, defining a secondary flowpath portion,
- a grid of outlet guide vanes, each outlet guide vane extending within the secondary flowpath portion between the outer wall and the inner wall,
- wherein, at the grid of outlet guide vanes and in a plane orthogonal to the longitudinal axis, a distance from the outer wall to the longitudinal axis along a first axis orthogonal to the longitudinal axis is greater than a distance from the outer wall to the longitudinal axis along a second axis orthogonal to the longitudinal axis and to the first axis,
- wherein the grid of outlet guide vanes comprises a plurality of surfaces, each surface being comprised between two adjacent outlet guide vanes, the inner wall and the outer wall, in a plane orthogonal to the longitudinal axis, wherein each surface has a surface area that varies from 0% to 10% compared to the other surfaces over the entire grid of outlet guide vanes, and
- wherein the outer wall defines in the plane orthogonal to the longitudinal axis a concave-like shape when viewed from an interior of the secondary flowpath, and
- wherein the inner wall defines in said plane orthogonal to the longitudinal axis a shape identical to that of the outer wall.

10. A portion of a bypass of a turbomachine extending about a longitudinal axis, comprising:
- an outer wall and an inner wall, defining a secondary flowpath portion,
- a grid of outlet guide vanes, each outlet guide vane extending within the secondary flowpath portion between the outer wall and the inner wall,
- wherein, at the grid of outlet guide vanes and in a plane orthogonal to the longitudinal axis, a distance from the outer wall to the longitudinal axis along a first axis orthogonal to the longitudinal axis is greater than a distance from the outer wall to the longitudinal axis along a second axis orthogonal to the longitudinal axis and to the first axis,
- wherein the outer wall defines in the plane orthogonal to the longitudinal axis a concave-like shape when viewed from an interior of the secondary flowpath,
- and wherein the outer wall defines in said plane orthogonal to the longitudinal axis an oblong shape constructed using two centers from which portions of circles, connected together, are drawn.

* * * * *